(12) United States Patent
Kasravi

(10) Patent No.: US 7,593,909 B2
(45) Date of Patent: Sep. 22, 2009

(54) KNOWLEDGE REPRESENTATION USING REFLECTIVE LINKS FOR LINK ANALYSIS APPLICATIONS

(75) Inventor: Kas Kasravi, West Bloomfield, MI (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1096 days.

(21) Appl. No.: 10/455,780

(22) Filed: Jun. 5, 2003

(65) Prior Publication Data

US 2004/0249829 A1    Dec. 9, 2004

Related U.S. Application Data

(63) Continuation-in-part of application No. 10/401,104, filed on Mar. 27, 2003.

(51) Int. Cl.
*G06N 5/00* (2006.01)

(52) U.S. Cl. .............................. 706/45; 707/2; 707/102; 707/103 R

(58) Field of Classification Search .................... 706/45; 707/2, 102, 103 R
See application file for complete search history.

(56) References Cited

U.S. PATENT DOCUMENTS

| | | | | |
|---|---|---|---|---|
| 4,868,733 A * | 9/1989 | Fujisawa et al. | ............... | 707/5 |
| 5,878,406 A | 3/1999 | Noyes | .......................... | 706/55 |
| 5,999,940 A * | 12/1999 | Ranger | .................... | 707/103 R |
| 6,487,556 B1 * | 11/2002 | Downs et al. | ............... | 707/101 |
| 2002/0091696 A1 | 7/2002 | Craft et al. | ..................... | 707/10 |
| 2003/0018616 A1 | 1/2003 | Wilbanks et al. | ............... | 707/2 |

FOREIGN PATENT DOCUMENTS

| | | |
|---|---|---|
| WO | WO 99/34307 | 7/1999 |
| WO | WO 00/29980 | 5/2000 |
| WO | WO 02/063502 | 8/2002 |

OTHER PUBLICATIONS

International Search Report, PCT/US2004/009077, Nov. 8, 2004, pp. 1-5.

M. P. Papazoglou, "Unraveling the Semantics of Conceptual Schemas," Sep. 1, 1995, Communications of the ACM, vol. 38, No. 9, XP000558793, pp. 80-94.

(Continued)

*Primary Examiner*—David R Vincent
*Assistant Examiner*—Mai T Tran

(57) ABSTRACT

Systems and techniques for facilitating link analysis may be implemented by storing data regarding a knowledge domain. The data may include information about nodes and reflective links. Each node may represent an entity in the knowledge domain. Each reflective link may represent a relationship between a respective pair of nodes, including a first node and a second node. Each reflective link may include information about a first set of characteristics for the relationship of the first node to the second node and a second set of characteristics for the relationship of the second node to the first node. By allowing the first set of characteristics to be different from and to include reflective characteristics of the second set of characteristics, different properties and functions can be associated with each direction of the reflective link. Link analysis may be performed on nodes and reflective links to more effectively infer new knowledge.

22 Claims, 4 Drawing Sheets

OTHER PUBLICATIONS

Robert Ayres, "The Functional Data Model as the Basis for an Enriched Database Query Language," Mar. 1999, Journal of Intelligent Information Systems, vol. 12, No. 2, XP002299883, pp. 139-164.

Robert L. Griffith, "Three Principles of Representation for Semantic Networks," Sep. 3, 1982, ACM Transactions on Database Systems, vol. 7, No. 3, XP002301967, pp. 417-442.

John L. Schnase, John J. Leggett, David L. Hicks, and Ron L. Szabo, "Semantic Data Modeling of Hypermedia Associations," Jan. 1993, ACM Transactions on Information Systems, vol. 11, No. 1, XP002301968, pp. 27-50.

M. Azmoodeh, "BRMQ: A Database Interface Facility based on Graph Traversals and Extended Relationships on Groups of Entities," Feb. 1, 1990, The Computer Journal, vol. 33, No. 1, XO000140529, pp. 31-39.

Roger D. Horn, J. Douglas Birdwell, and Leonard W. Leedy, "Link Discovery Tool," Aug. 18, 1997, ONDCP/CTAC International Symposium, XP002301969, pp. 1-5.

Stanley Y. W. Su, Shirish Puranik, and Herman Lam, "Heuristic Algorithms for Path Determination in a Semantic Network," 1990, Computer Software and Applications, XP010019773, pp. 587-592.

Hsinchun Chen, Roslin V. Hauck, Horna Atabakhsh, Harsh Gupta, Chris Boarman, Jennifer Schroeder, and Linda Rigdeway, "COPLINK: Information and Knowledge Management for Law Enforcement," Nov. 5, 2000, Proceedings of SPIE, vol. 4232, XP002301970, pp. 293-304.

Donovan Hsieh, "A Logic to Unify Semantic Network Knowledge Systems with Object-Oriented Database Models," Jan. 7, 1992, System Sciences, XP010025898, pp. 347-358.

PCT International Search Report, PCT/US2004/009079, Oct. 27, 2004, pp. 5.

PCT Notification Concerning Transmittal of International Preliminary Report on Patentability, PCT/US2004/009079, Dec. 6, 2007, 9 pages.

Pietro Cerveri, Marco Masseroli, Francesco Pinciroli, Luisa Portoni, and Laura Vizzotto, "Anatomical Knowledge Representation: Attempting Querying Integration on VHD via UMLS," Oct. 5, 2000, National Library of Medicine, XP-002299881, pp. 1-16.

Richard Lee, "Automatic Information Extraction from Documents: A Tool for Intelligence and Law Enforcement Analysts," Oct. 23, 1998, XP-002299882, pp. 63-67.

A Delphi Group White Paper, "Taxonomy & Content Classification," Nov. 4, 2002, XP-002299884, pp. 1-60.

Amit Sheth, Clemens Bertram, David Avant, Brian Hammond, Krysztof Kochut, and Yashodhan Warke, "Managing Semantic Content for the Web," Jul.-Aug. 2002, XP-001130966, pp. 80-87.

* cited by examiner

KNOWLEDGE REPRESENTATION USING REFLECTIVE LINKS FOR LINK ANALYSIS APPLICATIONS

CROSS REFERENCE TO RELATED APPLICATIONS

This application is a continuation in part of and claims the benefit of priority from U.S. application Ser. No. 10/401,104, titled "Data Representation for Improved Link Analysis" and filed Mar. 27, 2003, which is incorporated by reference.

TECHNICAL FIELD

This description relates to link analysis, and more particularly to using reflective links for improved link analysis.

BACKGROUND

In link analysis, data sets may be represented as collections of linked entities, and the topology and connections among the various entities can be analyzed to uncover valuable information. Each entity may symbolize a real world object, such as a person, place, physical object, business unit, phone number, and the like, and each connection between entities may represent an association or relationship between the entities. In general, entities may be represented as nodes and connections as links. Using this type of data representation, a document collection may be represented as documents connected by citations and hypertext links. As another example, an organization may be represented as individuals that are associated according to reporting assignments, social relationships, and communication patterns.

Link analysis may be "visual" or "algorithmic." Visual link analysis presents to an analyst an image of the entities and their connections. The analyst may use the image to discover relationships or otherwise infer new knowledge. Algorithmic link analysis involves a more sophisticated and deeper analysis of the linked entities, such as the distance between two nodes and/or whether two nodes are related through a specific third node. By at least partially automating the process, algorithmic link analysis may facilitate a more efficient evaluation of connections and relationships among entities.

Applications of link analysis are typically investigative in nature. For example, terrorist investigations have increasingly involved a study of the relationships among people, common residences, banks, fund transfers, and known terrorist organizations. Link analysis may also be used in other law enforcement or fraud detection efforts to identify associations among individuals and organizations; in epidemiology to discover connections between people, animals, homes, and workplaces; in evaluating complex computer systems; and in information retrieval to analyze relationships among web pages, news stories, or other document collections. Accordingly, link analysis is potentially valuable to a wide variety of enterprises, including, for example, organizations involved with business intelligence and knowledge management.

In performing link analysis, one must first develop a topology (e.g., known links between people, things, and events). The topology may be constructed using multiple, heterogeneous data sources. The value of link analysis is in using the topology to predict and infer previously unknown relationships among entities. Such predictions and inferences may be made, for example, by looking at the distance (e.g., the number of links) between entities, a connection between two entities through a specific third entity, or a pattern of events. For example, by examining a set of activities, it may be possible to discover a relationship between entities or to predict an upcoming event.

SUMMARY

Techniques for representing data for use in link analysis applications may be implemented to provide improved insights about the relationships among entities. Conventional techniques for representing data may be inadequate for effectively representing the characteristics of links that represent relationships between entities or nodes. For example, traditional link analysis models generally use links that merely show a connection between two nodes but that do not contain information about the characteristics of the link. Techniques are provided for using reflective links that provide different characteristics for the links depending on the direction of the link and that provide properties and functions that are associated with the links.

In one general aspect, data regarding a knowledge domain may include information about nodes and reflective links. Each node may represent an entity in the knowledge domain. Each reflective link may represent a relationship between a respective specified pair of nodes. The specified pair of nodes may include a first node and a second node. Each reflective link may also include a first set of characteristics for the relationship of the first node to the second node and a second set of characteristics for the relationship of the second node to the first node. The first set of characteristics may be different from the second set of characteristics and may include reflective characteristics of the second set of characteristics. Link analysis may be performed on the nodes and the reflective links to infer new knowledge about the knowledge domain.

Implementations may represent one or more of the following features. For example, each reflective link may include a first link from the first node to the second node and a second link from the second node to the first node. The first link may be associated with the first set of characteristics and the second link may be associated with the second set of characteristics. The first set of characteristics may include properties and/or functions associated with the relationship of the first node to the second node and the second set of characteristics may include properties and/or functions associated with the relationship of the second node to the first node.

A link analysis module may be operable to perform a search of the nodes and the reflective links to identify reflective links that satisfy selected criteria. The search may also be used to identify nodes based at least in part on an association with a reflective link that satisfies the selected criteria. The link analysis module may be operable to perform the search by iteratively identifying nodes that are linked to a selected starting node, either directly or through one or more intermediate nodes, by one or more reflective links that satisfy the selected criteria. A link reflection look-up table may store information about reflective link characteristics, and the link analysis module may be operable to perform the search by using the information from the link reflection look-up table to identify reflective links that satisfy the selected criteria.

A management utility may be used for managing the data regarding the nodes and the reflective links.

An extraction utility may be used for extracting node and link data from a data source and storing the node and link data.

Link analysis may be performed on the data representing nodes and reflective links by identifying a starting node for a link analysis search and iteratively searching for nodes that are linked to the starting node by one or more links that satisfy the selected criteria. The iterative search may include considering the characterisitics of links in both directions. The selected criteria may relate to one or more selected properties and/or functions. The iterative search may involve searching for links that satisfy the selected criteria in a first direction away from the starting node and searching for links that satisfy the selected criteria in the second direction using information about reflective characteristics of the links in the first direction. For each link, the reflective characteristics may represent predefined characteristics known to be associated with the link in the second direction based on the characteristics of the link in the first direction. The iterative search may also involve searching for nodes that are linked to an intermediate node by a link that satisfies the selected criteria. Each intermediate node may represent a node that is linked to the starting node by one or more of a series of links that satisfy the selected criteria.

The search for links in the second direction may be performed only with respect to intermediate nodes for which a link in the first direction that satisfies the selected criteria cannot be found.

The described techniques may be implemented, for example, in a system for facilitating link analysis, by a machine-readable medium that stores the information about the nodes and the reflective links, or in a method for performing link analysis.

The details of one or more implementations are set forth in the accompanying drawings and the description below. Other features, will be apparent from the description and drawings, and from the claims.

DESCRIPTION OF DRAWINGS

Like reference symbols in the various drawings indicate like elements.

DETAILED DESCRIPTION

Systems and techniques may be provided for capturing detailed knowledge about relationships between entities in a domain. Essentially, the entire domain may be modeled by nodes and links.

A node is defined as any entity in the domain (e.g., a person, place, company, or vehicle) and a link is defined as any relationship between the two nodes (e.g., ownership, employee, sibling, and the like). Nodes do not necessarily need to represent actual physical objects. For example, nodes may also represent characteristics or properties (e.g., a name, phone number, account number, or identification number associated with a person or company). In traditional link analysis techniques, each link is a simple connection between two nodes. For example, an employee and an employer may be "linked" to each other. The nature of the link is often transparent or requires additional objects to define the characteristics of the link. In one previously proposed technique, a third node associated with a link was introduced to capture information about the relationships.

In accordance with the described systems and techniques, and unlike traditional link analysis models, information about relationships between nodes is stored using reflective links. A reflective link is a connection between two nodes that may embed different properties and functions based on the direction of the link. Reflective links may represent bidirectional links that conceptually are reciprocals of one another. A reflective link may be represented as a single link that has different properties and/or functions based on the direction of the link. A reflective link will generally possess at least some characteristics (i.e., properties and/or functions) in one direction that are known, or subject to some type of constraint, based on the characteristics in the other direction. Such characteristics that are known or constrained in one direction based on characteristics in the other direction may be referred to as "reflective characteristics."

Figure 1:
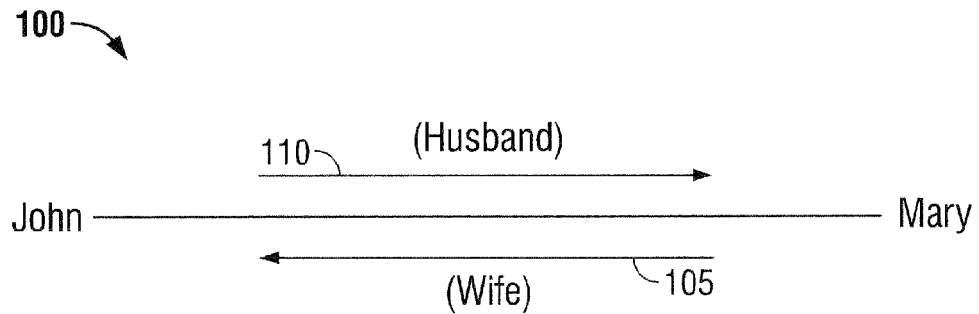
FIG. 1 is an illustrative example of a reflective link.

FIG. 1 is an illustrative example of a reflective link 100. The reflective link represents a marriage relationship between two people named John and Mary. The reflective link 100 does not merely indicate that John and Mary are married, however. Instead, the reflective link 100 indicates that Mary is John's wife and that John is Mary's husband. Thus, the reflective link includes two underlying links—one link 105 indicating that Mary is related to John by a "wife" link and a link 10 in the opposite direction indicated that John is related to Mary by a "husband" link. The illustrated example is relatively simplistic, and specific applications may use reflective links that include more extensive properties and functions.

The specific properties and functions embedded in reflective links may vary for different applications. In one implementation, the properties may include a name that identifies the link; a type that identifies the type of the link (e.g., husband); temporal information that identifies any date/time attributes of the link, such as start and/or end dates; location-specific information for the link; a strength attribute that identifies the relative strength of the link; priority data that indicates a priority of the link relative to other links; and security data that controls access to the nodes. The functions may include statistical functions that are used to track the link's usage statistics, such as frequency of use or distances associated with the link; heuristic functions that are used in validating the applicability of the link for a particular link analysis investigation; neighborhood functions that provide information about the nodes within a particular distance from the link (e.g., located within a small number of links); and visualization functions that provide visual images of the information associated with the link and the nodes associated with the link. In specific implementations, fewer or additional properties and functions may be associated with the reflective links depending upon the available data for a particular relationship and the specific application.

Figure 2:
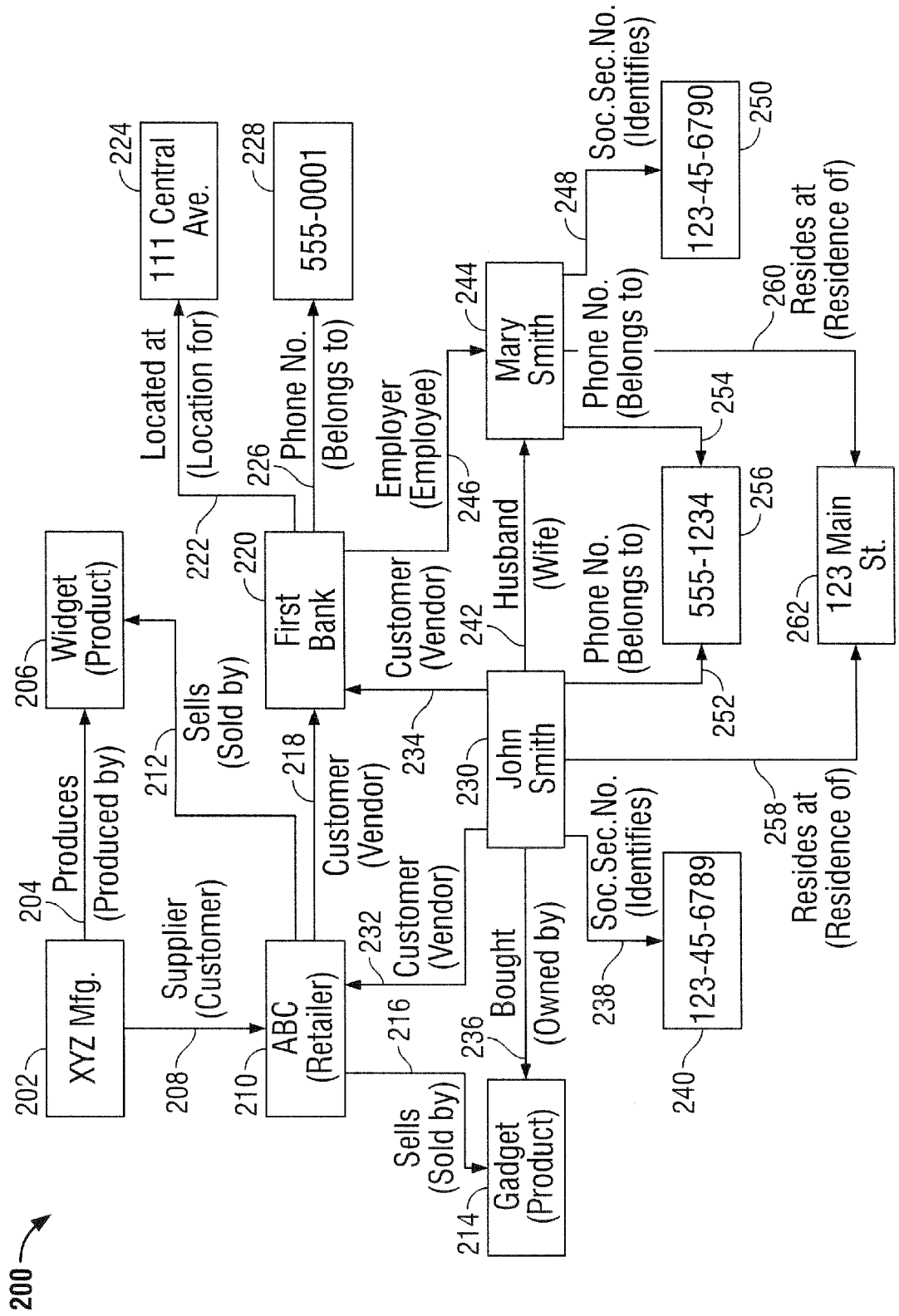
FIG. 2. is an illustrative example of a link diagram.

FIG. 2. is an illustrative example of a link diagram 200. The link diagram 200 is representative of the type of information that may be used in performing link analysis. The link diagram 200 includes a number of nodes that are connected by reflective links. The nodes represent entities (including, in some cases, properties or characteristics) and the reflective links represent relationships among the nodes. Each of the reflective links represents links in two directions and indicates the link type and reflection characteristics of the links, although the reflective link might also include other characteristics.

In FIG. 2, each reflective link is shown as having a particular designated direction. The designated direction represents a first link having one set of characteristics, while a second link in the opposite direction has reflective characteristics of the first link. In other words, the second link has predefined characteristics (indicated by a parenthetical) that are known or expected to be present based on the characteristics of the first link. For instance, if a link in one direction is "wife," then it is known that the link in the other direction is "husband." In some cases, the reflective characteristics may be only a subset of the characteristics associated with the second link. Thus, some characteristics of the second link may be independent of the characteristics of the first link and may not be known from those characteristics.

In the example of FIG. 2, an XYZ Manufacturing node 202 has an associated reflective link 204 that indicates that XYZ Manufacturing produces a widget product (node 206) and that the widget product is produced by XYZ Manufacturing. The XYZ Manufacturing node 202 also has an associated reflective link 208 that indicates that XYZ Manufacturing is a supplier to retailer ABC (node 210) and that retailer ABC is a customer of XYZ Manufacturing.

Retailer ABC sells the widget product (node 206) as indicated by a reflective link 212 and also sells a gadget product (node 214) as indicated by another reflective link 216. The reflective characteristics of the reflective links 212 and 216 indicate that the widget product and the gadget product are sold by Retailer ABC.

A reflective link 218 indicates that retailer ABC (node 210) is a customer of First Bank (node 220) and likewise that First Bank is a vendor for retailer ABC. First Bank is associated with a reflective link 222 indicating that it is located at 111 Central Avenue (node 224) and that 111 Central Avenue is the location for First Bank. Another reflective link 226 indicates that the phone number for First Bank is "555-0001" (node 228) and that the phone number "555-0001" belongs to First Bank.

A node 230 represents a person named John Smith, and reflective links 232 and 234 indicate that John Smith is a customer of retailer ABC (node 210) and First Bank (node 220), respectively, and that retailer ABC and First Bank are vendors for John Smith. A reflective link 236 indicates that John Smith bought a gadget product (node 214) and that the gadget product is owned by John Smith. Another reflective link 238 indicates that John Smith has a social security number of "123-45-6789" (node 240) and that the social security number identifies John Smith. Yet another reflective link 242 indicates that John Smith is the husband of Mary Smith (node 244), and thus has a wife by that name. A reflective link 246 indicates that Mary Smith is employed by First Bank (node 220), which is Mary Smith's employer. Another reflective link 248 indicates that Mary Smith has a social security number of "123-45-6790" (node 250) and that the social security number identifies Mary Smith. Both John Smith (node 230) and Mary Smith (node 244) have a phone number of "555-1234" (node 256), as indicated by reflective links 252 and 254, and reside at 123 Main Street (node 262), as indicated by reflective links 258 and 260. Similarly, the reflective links 252 and 254 indicate that the phone number "555-1234" belongs to John Smith and Mary Smith, and the reflective links 258 and 260 indicate that 123 Main Street is the residence of John Smith and Mary Smith.

Although the illustrated link diagram 200 is in the context of a particular type of domain, virtually any type of domain in which relationships exist among items of data can be represented as a link diagram. The links may contain different levels of information than those illustrated. For example, a link may not indicate that the associated information is, e.g., a social security number; instead, the link may merely represent ownership or some one-to-one correspondence between a person and a social security number.

The ultimate purpose of the link diagram, or the information represented in the link diagram, may be to perform some type of link analysis. For example, in the illustrated link diagram, a search of the link diagram 200, or the information represented by the link diagram 200, may reveal that there is a link between a certain address (e.g., 123 Main Street (node 262)) and another item in the domain (e.g., a gadget product (node 214) purchased from retailer ABC (node 210)). Such a search may be performed manually using a visual analysis of the link diagram 200 or using some type of automated or algorithmic analysis, which may be performed using a processor programmed with instructions for performing a search of nodes and links stored in a memory.

In performing link analysis, reflective links support improved search and knowledge discovery capabilities by better defining the context of the relationships among the nodes. For example, reflective links may be used to support improved route planning, such as by simplifying airline logistics and pricing using links that have associated properties and functions. In particular, a link analysis may be performed using reflective links to identify an optimal route for travel or shipping by airline to provide a balance among time, cost, and efficient use of resources. In addition, the use of reflective links provides better heuristics (by embedding some prior knowledge in the reflective link, for example). As an example, if one link is of type "husband," the reflection of that link cannot be of type "brother." Reflective links can also help provide better look-ahead capabilities by serving as predictive tools. For example, if a person with ties to terrorism is about to take a trip, a reflective link might help predict that a location near the person's destination is potentially going to be a target of a terrorist attack.

Figure 3:
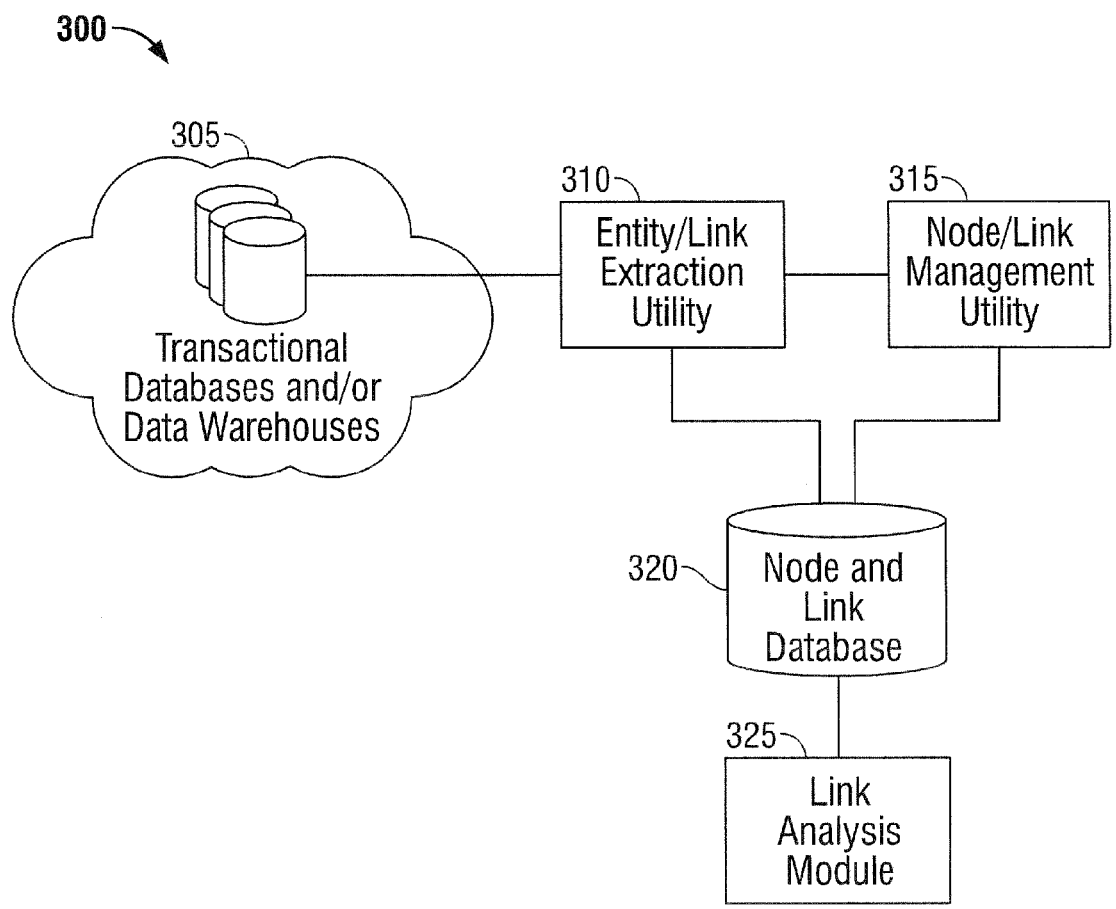
FIG. 3 is a block diagram of a link analysis system.

FIG. 3 is a block diagram of a link analysis system 300. The link analysis system 300 includes a data source 305, an entity/link extraction utility 310, a node/link management utility 315, a node/link database 320, and a link analysis module 325. The data source 305 is the knowledge domain from which the data for performing link analysis, and for generating the node and link structure, is obtained. The data source 305 may include any number of different sources of data. Initially, the data may be partially consolidated, through manual or electronic entry, in transactional databases, data warehouses, and/or other data storage media.

The node/link management utility 315 manages the node and link data. To this end, the node/link management utility 315 may provide a set of tools for operating on the node and link data. In addition, the node/link management utility 315 may implement a set of rules that govern the construction of the node/link database 320.

The entity/link extraction utility 310 extracts information from the data source 305 to identify entity pairs that are related to one another through a link, along with the information regarding the link and any reflective characteristics. The entity/link extraction utility 310 may perform a type of extract, transform, and load (ETL) operation for purposes of populating the node/link database 320. Generally, the entity/link extraction utility 310 may be application-specific, in that the extraction, transformation, and loading functions are specifically tailored to the type of link analysis to be performed.

The node/link database 320 stores the information provided by the entity/link extraction utility 310.

The link analysis module 325 analyzes the data in the node/link database 320. The link analysis module 325 may include predefined queries and other search tools that facilitate rapid searches through the domain knowledge by traversing node-to-node using the links. For example, the link analysis module 325 may support a search for nodes that fit selected criteria and that are located within a certain number of links of one another. The link analysis module 335 may also support a search through certain types of links (e.g., financial transactions) to identify entities that may be related. Accordingly, the link analysis module 325 generates new knowledge inferred from the data in the node/link database 320.

As an example of the process of inferring new knowledge that may be performed by the link analysis module, the node/link database 320 may store node data representing a number of individuals, a number of bank accounts, and a number of residential addresses. The node/link database 320 may also store link data linking the individuals to deposits to and/or withdrawals from certain bank accounts and linking the individuals to certain residential addresses. One of the individuals may be known to have ties to terrorism. The links may indicate that this individual has made deposits to a bank account and that a second individual has made withdrawals from the same bank account. The second individual and a third individual may also be linked to a particular residential address. By traversing the links, it may be determined that the third individual might have ties to terrorism as a result of his shared residence with an individual (i.e., the second individual) who has made withdrawals from a bank account to which deposits were made by an individual with known ties to terrorism (i.e., the first individual). The potential link between the third individual and terrorism activities may represent new knowledge that is inferred from the node/link database 320. The use of reflective links in such a link analysis process may provide improved results by helping increase the efficiency of the process.

The link analysis system 300 and the techniques associated with the reflective links can be used for a variety of applications. For example, the systems and techniques may be used to enhance business intelligence and knowledge management capabilities. In addition, the systems and techniques can be used to develop a wide range of investigative applications, such as anti-terrorism research, fraud detection, law enforcement investigations, employee background checks, chat room monitoring, competitive analysis, profiling of individuals, companies, and organizations, patent analysis, investment analysis, transportation route optimization, manufacturing process planning, defect root-cause analysis, and intellectual capital harvesting.

Various implementations of the systems and techniques described here can be realized in digital electronic circuitry, integrated circuitry, specially designed ASICs (application specific integrated circuits), computer hardware, firmware, software, and/or combinations thereof. These various implementations can include one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) may include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

For example, the link analysis system 300 may be implemented in a computer system that includes software executable on a programmable processor. The data source 305 may be implemented in one or more data storage mediums. The entity/link extraction utility 310 and the node/link management utility 315 may be implemented as software that may be executed on a computer or other processor. The entity/link extraction and the node/link management software may operate to store the node/link database 320 on a data storage medium or mediums. In addition, the node/link management utility 315 may provide users with the ability to access tools through a user interface to perform management operations on the data in the node/link database 320. The link analysis module 325 may also be implemented as software that operates on the data stored in the node/link database 320 and that supports a user interface through which users can execute queries or use other search tools. New inferred knowledge may then be generated as output and displayed on a user interface, such as a display screen, or stored in a database.

Figure 4:
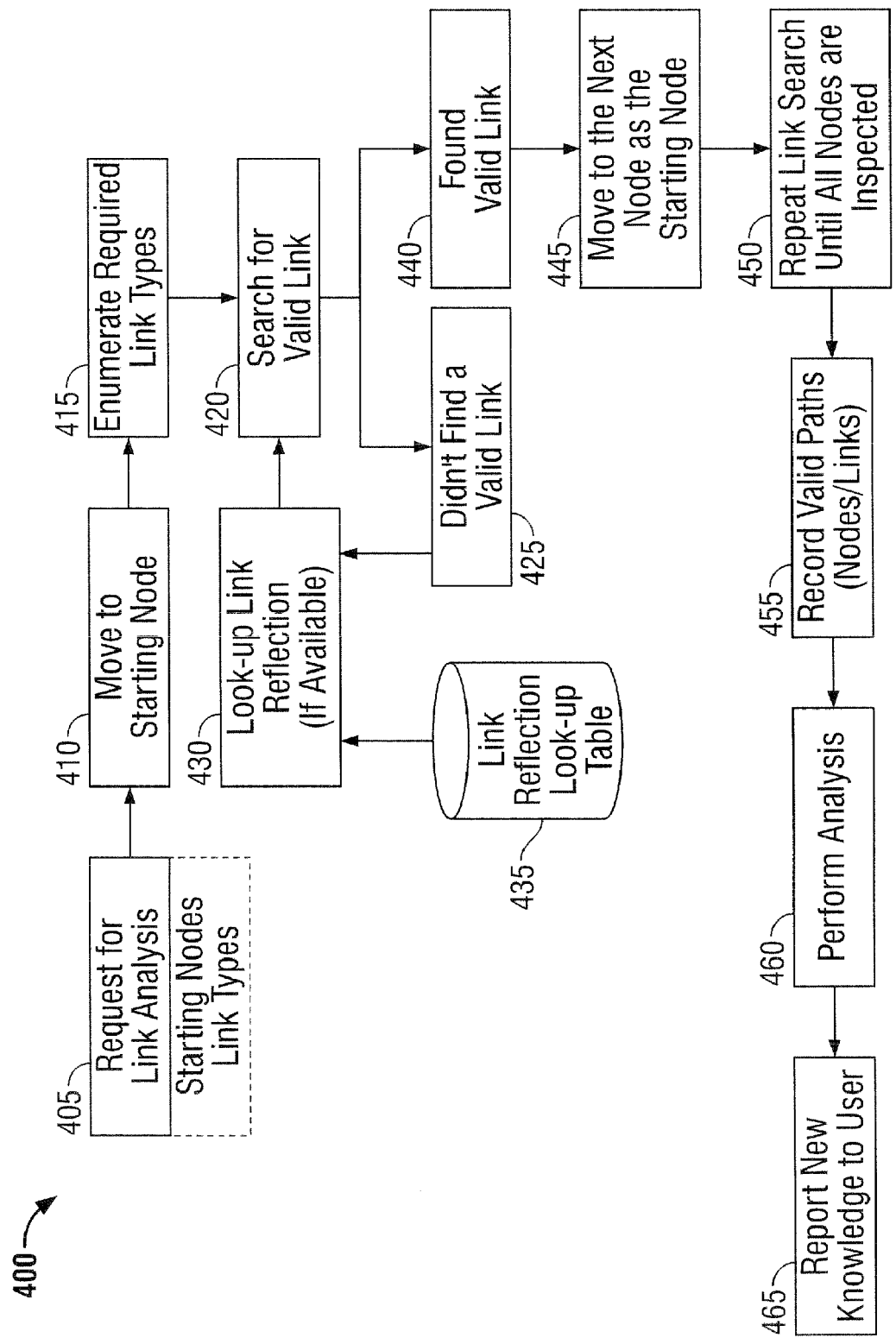
FIG. 4 is a flow diagram of a link analysis process that uses reflective links.

FIG. 4 is a flow diagram of a link analysis process 400 that uses reflective links. A request for a link analysis is received (step 405). The request includes an indication of the starting nodes and the link types or other link characteristics for which the link analysis is to be performed. The link analysis process 400 moves to the starting node (step 410) from which a link analysis search will begin. Using the link types or other characteristics identified in the request for the link analysis, the link types that are required to satisfy the search parameters are enumerated (step 415). A search for valid links associated with the starting node is then conducted (step 420).

If a valid link is not found (step 425), it is not immediately assumed that no valid links are present. Instead, the process 400 determines link reflections, if available, of the links that are attached to the starting node (step 430) using a link reflection look-up table 435. Thus while, the link search is performed initially on characteristics of the links in a direction away from the starting node, link reflections may be used to perform the search on links in a direction toward the starting node.

The link reflection look-up table 435 stores information about reflective characteristics of different types of links. For example, for a link of type "husband," the link reflection look-up table 435 would store information indicating that the reflection is "wife." Similarly, other properties and functions may have reflective characteristics. For example, a link in one direction may include some type of calculation, while the reflection may include a different type of calculation. By looking up link reflections, the search for valid links can also include searching the characteristics of links in the opposite direction (i.e., in a direction toward the starting node). Searching the links in both directions helps ensure that valid links are not missed.

If a valid link is found in either direction (step 440), the search moves to the node at the other end of the found link as the new starting node (step 445). The process 400 then returns to step 415 to perform another iteration of the search process from the new starting node (step 450). Each new starting node after the initial starting node may be referred to as an intermediate node. The process 400 continues in this manner by searching for additional intermediate nodes until no further valid links can be found. The nodes and links that represent valid paths are then recorded (step 455). An analysis of the path information may be performed (step 460), from which new knowledge may be identified or inferred and reported to a user of the link analysis process (step 465).

Figure 5C:
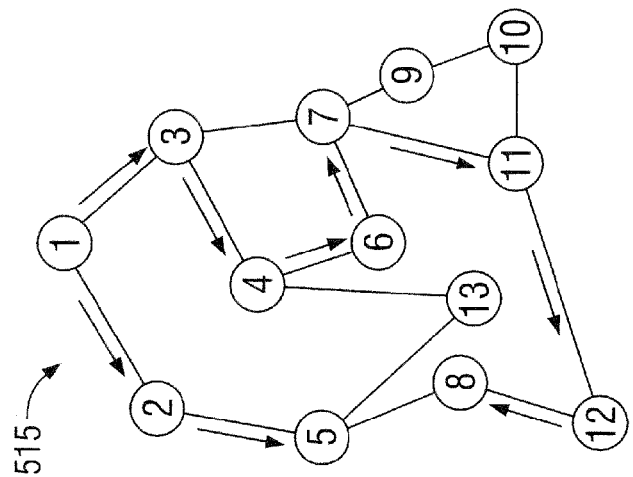
FIG. 5C is an illustrative example of a reflective link search process.
Figure 5B:
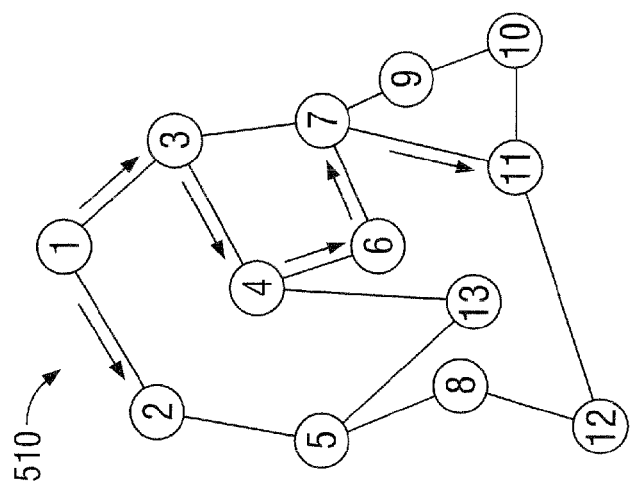
FIG. 5B is an illustrative example of a link search process.
Figure 5A:
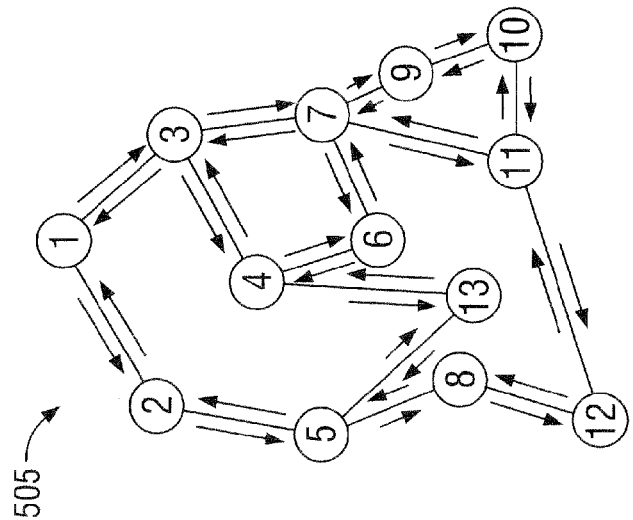
FIG. 5A is an illustrative example of an exhaustive link analysis search process.

FIGS. 5A-5C illustrate different types of link search strategies on the same domain. In general, the search strategy relates to a determination of which paths are selected as the search travels from node to node. FIG. 5A is an illustrative example of an exhaustive link analysis search process 505. In an exhaustive search, all links and nodes in the entire domain are searched. As a result, the number of links being searched expands exponentially. The exhaustive search process 505 therefore finds every link and node that may be relevant but is very time consuming, may not be practical from a cost perspective, and may return too many false positives (i.e., the search identifies links that satisfy the search criteria but that are not relevant to the analysis).

FIG. 5B is an illustrative example of a link search process 510 that represents another possible search strategy that is a more traditional approach. In a link search, the search begins from a starting node and locates links that emanate from the starting node. If a valid link is found, then the search continues from the node at the other end of the found link. However, if a valid link is not found, the search ends at that node. The link search process 510 is very quick but can miss valid nodes.

FIG. 5C is an illustrative example of a reflective link search process 515. The reflective link search is similar to the link search process 510 except that the search does not end if a valid link is not found in a first direction. Instead, the reflective characteristics of the links are also searched to determine whether the reflective links satisfy the search criteria. In this example, relevant nodes 5, 8, and 12 that were missed using the link search process 510 of FIG. 5B are found when using the reflective link search process 515. The reflective link search process 515 is therefore quick and finds only the relevant nodes.

A number of implementations have been described. Nevertheless, it will be understood that various modifications may be made. For example, link analysis may be performed using characteristics of both the nodes and the reflective links to identify relevant paths. Accordingly, other implementations are within the scope of the following claims.

What is claimed is:

1. A system for facilitating link analysis, the system comprising:
 a processor;
 at least one computer storage device encoded with a database for storing data regarding a knowledge domain, the data including:
  nodes, with each node representing an entity in the knowledge domain;
  reflective links, with each reflective link representing a relationship between a respective specified pair of nodes that include a first node and a second node, wherein each reflective link represents a first set of characteristics for the relationship of the first node to the second node and a second set of characteristics for the relationship of the second node to the first node, with the first set of characteristics being different from, and including reflective characteristics of, the second set of characteristics;
  wherein the nodes and reflective links form a topology of known relationships between at least two of: one or more physical entities, one or more characteristics of physical entities, or one or more properties of physical entities; and
 a memory storing instructions executable on the processor, wherein the memory includes a link analysis module including instructions for automatically analyzing the nodes and the reflective links in the at least one database by:
  identifying a starting node stored in the computer storage device, the starting node representing one or more of a physical entity, a characteristic of a physical entity, or a property of a physical entity;
  iteratively searching for nodes that are linked to the starting node, either directly or through one or more intermediate nodes, by at least one link that satisfies selected criteria, the nodes each representing one or more of a physical entity, a characteristic of a physical entity, or a property of a physical entity;
  identifying at least one link that satisfies the selected criteria to identify a potential relationship between at least two of: one or more physical entities, one or more characteristics of physical entities, or one or more properties of physical entities, the potential relationship not having been previously defined in the topology of known relationships; and
  storing information relating to the at least one link in the computer storage device.

2. The system of claim 1 wherein each reflective link represents a first link from the first node to the second node and a second link from the second node to the first node, with the first link having the first set of characteristics and the second link having the second set of characteristics.

3. The system of claim 1 wherein the first set of characteristics includes properties associated with the relationship of the first node to the second node and the second set of characteristics includes properties associated with the relationship of the second node to the first node.

4. The system of claim 1 wherein the first set of characteristics includes functions associated with the relationship of the first node to the second node and the second set of characteristics includes functions associated with the relationship of the second node to the first node.

5. The system of claim 1 wherein the link analysis module includes instructions for performing a search of the nodes and the reflective links in the at least one database to identify reflective links that satisfy selected criteria.

6. The system of claim 5 wherein the search further identifies nodes based at least in part on an association with a reflective link that satisfies the selected criteria.

7. The system of claim 6 wherein the link analysis module includes instructions for performing the search by iteratively identifying nodes that are linked to a selected starting node, through any intermediate nodes, by at least one reflective link that satisfies the selected criteria.

8. The system of claim 7 further comprising a link reflection look-up table for storing information about reflective link characteristics, wherein the link analysis module includes instructions for performing the search by using the information from the link reflection look-up table to identify reflective links that satisfy the selected criteria.

9. The system of claim 1 further comprising a management utility for managing the data stored in the at least one database.

10. The system of claim 1 further comprising an extraction utility for extracting node and link data from a data source and storing the node and link data in the at least one database.

11. A method for facilitating automated link analysis on data representing nodes and links, the nodes and links forming a topology of known relationships between at least two of: one or more physical entities, one or more characteristics of physical entities, or one or more properties of physical entities, and wherein data representing nodes and links is stored in a computer storage device, the method comprising:
 identifying, by a computer, a starting node stored in the computer storage device for a link analysis search, the starting node representing one or more of a physical entity, a characteristic of a physical entity, or a property of a physical entity;

iteratively searching, by a computer, for nodes in the computer storage device that are linked to the starting node by at least one link in the computer storage device that satisfies selected criteria, the nodes each representing one or more of a physical entity, a characteristic of a physical entity, or a property of a physical entity, and with each link defining a relationship between a corresponding pair of nodes in a particular direction such that each relationship is defined by a reflective link that has a first set of characteristics in a first direction and a second set of characteristics in a second direction opposite of the first direction;

identifying, by a computer, at least one link in the computer storage device that satisfies the selected criteria to identify a potential relationship between at least two of: one or more physical entities, one or more characteristics of physical entities, or one or more properties of physical entities, the potential relationship not having been previously defined in the topology of known relationships;

storing information relating to the at least one link in the computer storage device; wherein:

iteratively searching comprises automatically searching nodes and links stored in the computer storage device and includes considering characteristics in both the first direction and the second direction, and the first set of characteristics includes characteristics that are different from and reflective of characteristics in the second direction.

12. The method of claim 11 wherein the characteristics in the first direction and the characteristics in the second direction comprise at least one of properties and functions associated with the reflective link.

13. The method of claim 12 wherein the selected criteria relate to at least one selected characteristic comprising at least one of a property and a function.

14. The method of claim 11 wherein iteratively searching comprises:

searching for characteristics in the first direction that satisfy the selected criteria, with the first direction being a direction away from the starting node;

searching for characteristics in the second direction that satisfy the selected criteria using information about reflective characteristics of the first direction, wherein for each first direction of a reflective link the reflective characteristics represent predefined characteristics known to be associated with the corresponding second direction of the reflective link; and identifying nodes that are linked to the starting node by a reflective link that satisfies the selected criteria in at least one of a first direction or a second direction.

15. The method of claim 14 wherein iteratively searching further comprises searching for nodes that are linked to an intermediate node by a reflective link that satisfies the selected criteria, with each intermediate node representing a node that is linked to the starting node by at least one of a series of reflective links that satisfy the selected criteria.

16. The method of claim 15 wherein searching for characteristics in the second direction is performed only with respect to intermediate nodes for which characteristics that satisfy the selected criteria in the first direction cannot be found.

17. The method of claim 16 further comprising analyzing the found links and nodes to infer new knowledge.

18. An article comprising at least one machine-readable medium storing data comprising:

data relating to nodes, with each node representing an entity in a knowledge domain;

data relating to reflective links, with each reflective link representing a relationship between a respective specified pair of nodes that include a first node and a second node, wherein each reflective link represents a first set of characteristics for the relationship of the first node to the second node and a second set of characteristics for the relationship of the second node to the first node, with the first set of characteristics including reflective characteristics of the second set of characteristics;

wherein the nodes and reflective links form a topology of known relationships between at least two of: one or more physical entities, one or more characteristics of physical entities, or one or more properties of physical entities; and instructions for causing data processing apparatus to perform operations for facilitating automated link analysis, the operations comprising:

identifying a starting node stored in the machine-readable medium, the starting node representing one or more of a physical entity, a characteristic of a physical entity, or a property of a physical entity;

iteratively searching for nodes that are linked to the starting node, either directly or through one or more intermediate nodes, by at least one link that satisfies selected criteria, the nodes each representing one or more of a physical entity, a characteristic of a physical entity, or a property of a physical entity;

identifying at least one link that satisfies the selected criteria to identify a potential relationship between at least two of: one or more physical entities, one or more characteristics of physical entities, or one or more properties of physical entities, the potential relationship not having been previously defined in the topology of known relationships; and storing information relating to the at least one link in the machine-readable medium.

19. The article of claim 18 wherein each reflective link comprises a first link from the first node to the second node and a second link from the second node to the first node, with the first link having the first set of characteristics and the second link having the second set of characteristics.

20. The article of claim 19 wherein the first set of characteristics includes at least one of properties and functions associated with the relationship of the first node to the second node and the second set of characteristics includes at least one of properties and functions associated with the relationship of the second node to the first node.

21. The article of claim 19 wherein the at least one machine-readable medium further stores data comprising information about predefined reflective characteristics for the reflective links, wherein the predefined reflective characteristics comprise characteristics of second links that are known to correspond to characteristics for respective first links.

22. The article of claim 18 wherein the at least one machine-readable medium storing instructions operable to cause one or more machines to perform operations comprising analyzing the data relating to nodes and the data relating to reflective links to infer new knowledge.

* * * * *